(12) United States Patent
Myrhaug

(10) Patent No.: US 9,677,235 B2
(45) Date of Patent: Jun. 13, 2017

(54) PLANT AND METHOD FOR MELTING AND CLEANING OF SNOW AND ICE

(75) Inventor: Terje Myrhaug, Alesund (NO)

(73) Assignee: NCC Construction AS, Oslo (NO)

( * ) Notice: Subject to any disclaimer, the term of this patent is extended or adjusted under 35 U.S.C. 154(b) by 0 days.

(21) Appl. No.: 13/144,399

(22) PCT Filed: Jan. 26, 2010

(86) PCT No.: PCT/EP2010/050817
§ 371 (c)(1),
(2), (4) Date: Jul. 13, 2011

(87) PCT Pub. No.: WO2010/084195
PCT Pub. Date: Jul. 29, 2010

(65) Prior Publication Data
US 2011/0290742 A1      Dec. 1, 2011

(30) Foreign Application Priority Data

Jan. 26, 2009    (NO) .................................. 20090381

(51) Int. Cl.
*E01H 5/10* (2006.01)
(52) U.S. Cl.
CPC .................................. *E01H 5/102* (2013.01)
(58) Field of Classification Search
None
See application file for complete search history.

(56) References Cited

U.S. PATENT DOCUMENTS

| | | | | |
|---|---|---|---|---|
| 294,084 | A * | 2/1884 | Schulze | 104/279 |
| 553,401 | A * | 1/1896 | Von Garnier | 126/343.5 R |
| 642,314 | A * | 1/1900 | Finigan | 366/144 |
| 770,169 | A * | 9/1904 | Davis | 126/343.5 R |
| 840,444 | A * | 1/1907 | Elliot | 126/343.5 R |
| 942,337 | A * | 12/1909 | Moore | 126/343.5 R |
| 995,446 | A * | 6/1911 | Evans | 37/227 |
| 1,150,946 | A * | 8/1915 | Kenlon | 37/197 |
| 1,388,027 | A * | 8/1921 | Connolly | 126/343.5 R |
| 1,462,527 | A * | 7/1923 | Tully | 37/228 |
| 1,468,977 | A * | 9/1923 | Schiesari | 37/197 |
| 1,665,503 | A * | 4/1928 | McClave et al. | 126/343.5 R |
| 1,718,360 | A * | 6/1929 | Kaczorowski | 37/274 |
| 2,104,363 | A * | 1/1938 | Devlin | 37/228 |
| 2,466,773 | A * | 4/1949 | Kestenbaum et al. | 252/70 |

(Continued)

FOREIGN PATENT DOCUMENTS

| | | |
|---|---|---|
| JP | 3262811 A | 11/1991 |
| JP | 10266153 A | 10/1998 |

(Continued)

OTHER PUBLICATIONS

Fernandez, Eva, "International Search Report", for PCT/EP2010/050817, as mailed May 21, 2010, 3 pages.

*Primary Examiner* — Robert James Popovics
(74) *Attorney, Agent, or Firm* — Winstead PC

(57) ABSTRACT

Plant for melting and cleaning of snow and ice, distinguished in that the plant comprises a means for melting using enthalpy of a water source in order to melt snow and ice, and a means for cleaning for cleaning out the pollution from the water phase that contains the melted snow and ice. Method for melting and cleaning of snow and ice, using the plant according to the invention.

12 Claims, 3 Drawing Sheets

(56) References Cited

U.S. PATENT DOCUMENTS

Figure 1:
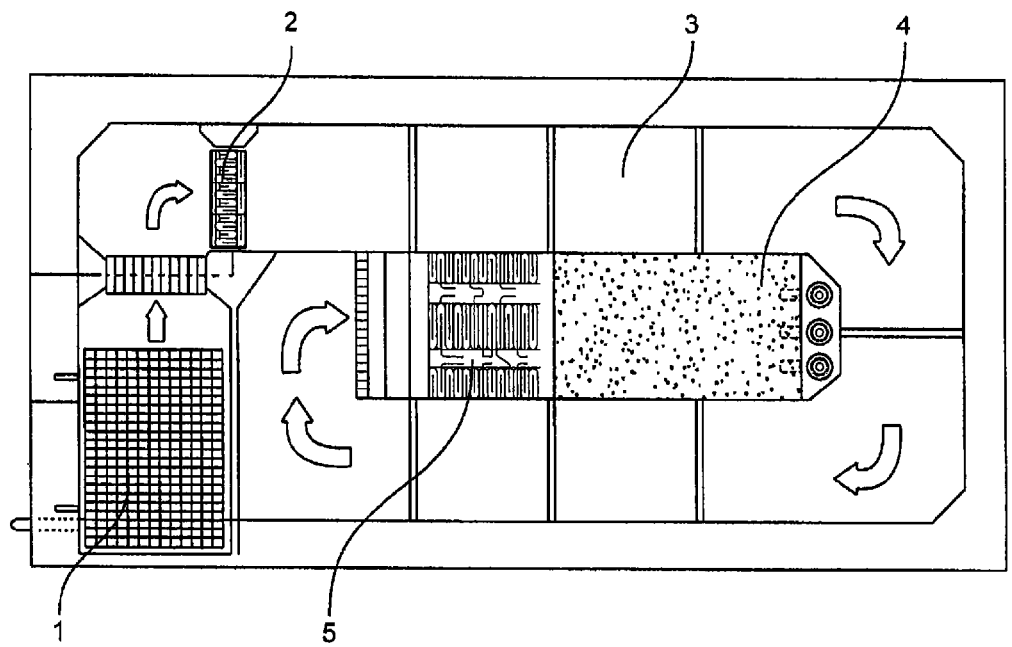

| | | | | |
|---|---|---|---|---|
| 2,471,733 A * | 5/1949 | Fiduccia | | 126/343.5 R |
| 2,490,047 A * | 12/1949 | Gilchrist, Jr. et al. | | 252/70 |
| 2,877,762 A * | 3/1959 | Flynn | | E01H 5/104 |
| | | | | 126/343.5 R |
| 2,977,955 A * | 4/1961 | Altenburg | | E01H 5/104 |
| | | | | 126/343.5 R |
| 2,991,784 A * | 7/1961 | Canzano | | 126/343.5 R |
| 3,036,391 A * | 5/1962 | Kemp | | 37/228 |
| 3,052,231 A * | 9/1962 | West | | E01H 5/102 |
| | | | | 126/343.5 R |
| 3,066,428 A * | 12/1962 | Raiti | | 37/228 |
| 3,123,922 A * | 3/1964 | Spinelli | | 126/343.5 R |
| 3,155,089 A * | 11/1964 | Hoyt | | 126/343.5 R |
| 3,166,065 A * | 1/1965 | Dunn | | 126/343.5 R |
| 3,259,123 A * | 7/1966 | Sangivanni | | 126/343.5 R |
| 3,270,741 A * | 9/1966 | Petlak | | E01H 5/102 |
| | | | | 126/343.5 R |
| 3,309,798 A * | 3/1967 | Devlin et al. | | 37/228 |
| 3,338,064 A * | 8/1967 | Karnofsky | | 62/535 |
| 3,338,065 A * | 8/1967 | Ashley | | 62/123 |
| 3,353,286 A * | 11/1967 | Marks | | 37/228 |
| 3,372,995 A * | 3/1968 | Ryan | | 422/261 |
| 3,382,603 A * | 5/1968 | Oberto | | 43/129 |
| 3,404,470 A * | 10/1968 | Raiti | | B65F 3/18 |
| | | | | 126/343.5 R |
| 3,464,128 A * | 9/1969 | Krickovich | | 37/228 |
| 3,540,430 A * | 11/1970 | Rudnik | | 126/343.5 R |
| 3,614,873 A * | 10/1971 | Cole | | E02B 15/041 |
| | | | | 210/242.3 |
| 3,619,918 A * | 11/1971 | Morin | | 37/228 |
| 3,684,095 A * | 8/1972 | Ayers | | E02B 15/048 |
| | | | | 210/242.3 |
| 3,744,257 A * | 7/1973 | Spanner | | E02B 15/104 |
| | | | | 210/242.3 |
| 3,747,587 A * | 7/1973 | McKenzie | | E03B 3/30 |
| | | | | 126/343.5 R |
| 3,752,317 A * | 8/1973 | Lithen | | B63B 35/32 |
| | | | | 210/242.3 |
| 3,754,653 A * | 8/1973 | Verdin | | E02B 15/048 |
| | | | | 210/197 |
| 3,766,586 A * | 10/1973 | Krickovich | | E01H 5/104 |
| | | | | 15/340.3 |
| 3,803,732 A * | 4/1974 | Moreno | | 37/228 |
| 3,813,892 A * | 6/1974 | Johnson et al. | | 62/535 |
| 3,837,311 A * | 9/1974 | Lea, Jr. | | 114/40 |
| 3,844,944 A * | 10/1974 | Mercuri | | B01D 17/0211 |
| | | | | 210/242.3 |
| 3,866,340 A * | 2/1975 | Krickovich | | 37/228 |
| 3,922,225 A * | 11/1975 | Strain | | E02B 15/106 |
| | | | | 210/242.3 |
| 3,988,241 A * | 10/1976 | Rafael | | 210/208 |
| 3,992,170 A * | 11/1976 | Karnofsky | | 62/535 |
| 4,039,454 A * | 8/1977 | Miller et al. | | 210/242.3 |
| 4,053,406 A * | 10/1977 | Deslauriers | | E02B 15/104 |
| | | | | 210/242.3 |
| 4,058,461 A * | 11/1977 | Gaw | | E02B 15/046 |
| | | | | 210/242.3 |
| 4,071,966 A * | 2/1978 | Cohen | | 37/228 |
| 4,100,687 A * | 7/1978 | Jeswine | | 37/250 |
| 4,105,554 A * | 8/1978 | Janson | | E02B 15/046 |
| | | | | 210/242.3 |
| 4,120,793 A * | 10/1978 | Strain | | E02B 15/046 |
| | | | | 210/175 |
| 4,131,107 A * | 12/1978 | Godbout | | 126/271.2 R |
| 4,157,016 A * | 6/1979 | Wendt | | E01H 12/006 |
| | | | | 134/105 |
| 4,178,247 A * | 12/1979 | Janson | | E02B 15/046 |
| | | | | 210/242.3 |
| 4,288,931 A * | 9/1981 | Rhodes | | 37/197 |
| 4,341,637 A * | 7/1982 | Smith | | E02B 15/104 |
| | | | | 210/143 |
| 4,347,703 A * | 9/1982 | Lukasavage | | 60/641.6 |
| 4,351,733 A * | 9/1982 | Salzer et al. | | 210/738 |
| 4,353,176 A * | 10/1982 | Hess | | 37/228 |
| 4,379,054 A * | 4/1983 | Ayers | | E02B 15/046 |
| | | | | 210/242.3 |
| 4,409,957 A * | 10/1983 | Muhammad | | E01H 5/102 |
| | | | | 126/343.5 R |
| 4,506,656 A * | 3/1985 | Baasch | | 126/343.5 R |
| 4,572,785 A * | 2/1986 | Braaten | | 210/181 |
| 4,577,679 A * | 3/1986 | Hibshman | | 165/45 |
| 4,615,129 A * | 10/1986 | Jackson | | 37/197 |
| 4,676,224 A * | 6/1987 | Ohno | | 126/343.5 R |
| 4,785,561 A * | 11/1988 | Swanson | | E01H 5/104 |
| | | | | 126/343.5 R |
| 4,798,012 A * | 1/1989 | Pasquier | | 37/219 |
| 4,799,945 A * | 1/1989 | Chang | | 62/532 |
| 4,813,165 A * | 3/1989 | Pelazza | | 37/228 |
| 4,827,637 A * | 5/1989 | Kahlbacher | | 37/237 |
| 4,954,151 A * | 9/1990 | Chang et al. | | 62/532 |
| 5,002,658 A * | 3/1991 | Isaacs | | 210/85 |
| 5,079,865 A * | 1/1992 | Hutson | | 37/229 |
| 5,126,040 A * | 6/1992 | Braid | | E02B 15/046 |
| | | | | 210/122 |
| 5,133,882 A * | 7/1992 | Stearns | | B01D 17/02 |
| | | | | 210/221.1 |
| 5,140,762 A * | 8/1992 | Monson | | E01H 5/12 |
| | | | | 37/227 |
| 5,199,198 A * | 4/1993 | Godbout | | 37/196 |
| 5,231,852 A * | 8/1993 | Conlon et al. | | 62/532 |
| 5,235,762 A * | 8/1993 | Brady | | E04D 13/103 |
| | | | | 126/343.5 R |
| 5,266,220 A * | 11/1993 | Hammond et al. | | 210/768 |
| 5,300,219 A * | 4/1994 | Braid | | E02B 15/046 |
| | | | | 210/122 |
| 5,469,645 A * | 11/1995 | Aiken | | 37/241 |
| 5,536,411 A * | 7/1996 | Blades | | 210/638 |
| 5,561,921 A * | 10/1996 | Vanderlinden | | 37/227 |
| 5,630,286 A * | 5/1997 | Vanderlinden | | 37/227 |
| 5,718,221 A * | 2/1998 | Lobato | | 126/343.5 R |
| 5,787,613 A * | 8/1998 | Derome | | 37/228 |
| 5,797,203 A * | 8/1998 | Vanderlinden | | 37/227 |
| 5,829,255 A * | 11/1998 | Sitnyakovsky et al. | | 60/688 |
| 5,953,837 A * | 9/1999 | Clifford | | 37/228 |
| 6,223,742 B1* | 5/2001 | Macameau | | 126/343.5 R |
| 6,305,105 B1* | 10/2001 | Lowman | | 37/228 |
| 6,360,738 B1* | 3/2002 | Brooks | | 126/343.5 R |
| 6,390,733 B1* | 5/2002 | Burbage et al. | | 405/203 |
| 6,694,927 B1* | 2/2004 | Pouchak et al. | | 122/448.1 |
| 6,736,129 B1* | 5/2004 | Smith | | 126/343.5 R |
| 6,904,708 B2* | 6/2005 | Rogers | | 37/228 |
| 6,971,596 B2* | 12/2005 | Monroe | | 241/86.1 |
| 7,077,346 B2* | 7/2006 | Monroe | | 241/86.1 |
| 7,182,860 B2* | 2/2007 | Lundin | | 210/173 |
| 7,814,898 B2* | 10/2010 | Rumbaugh | | 126/343.5 R |
| 7,958,656 B2* | 6/2011 | Soderberg et al. | | 37/228 |
| 8,075,175 B2* | 12/2011 | Eble et al. | | 366/145 |
| 8,097,152 B2* | 1/2012 | Lewis | | 210/173 |
| 8,640,687 B2* | 2/2014 | Tucker | | E01H 5/102 |
| | | | | 126/343.5 R |
| 2003/0010334 A1* | 1/2003 | Clinton | | E01H 5/102 |
| | | | | 126/343.5 R |
| 2005/0121547 A1* | 6/2005 | Monroe | | E01H 5/102 |
| | | | | 241/65 |
| 2006/0049289 A1* | 3/2006 | Monroe | | 241/65 |
| 2006/0185198 A1* | 8/2006 | Godbout | | 37/227 |
| 2007/0006874 A1* | 1/2007 | Potter | | E01H 5/102 |
| | | | | 126/343.5 R |
| 2007/0029402 A1* | 2/2007 | Rumbaugh | | 239/146 |
| 2007/0205293 A1* | 9/2007 | Kwak | | 236/21 B |
| 2008/0178866 A1* | 7/2008 | Davies | | 126/343.5 R |
| 2008/0276498 A1* | 11/2008 | Soderberg et al. | | 37/197 |
| 2009/0217554 A1* | 9/2009 | Tucker | | 37/228 |
| 2010/0143038 A1* | 6/2010 | Cobb | | E02B 15/0814 |
| | | | | 405/63 |
| 2010/0186647 A1* | 7/2010 | Lewis | | 114/26 |

(56) References Cited

U.S. PATENT DOCUMENTS

2010/0229916 A1* 9/2010 Bechamp .................. 136/244
2011/0290742 A1* 12/2011 Myrhaug .................. 210/767

FOREIGN PATENT DOCUMENTS

| JP | 11181730 A | 7/1999 |
| JP | 3638666 B2 | 4/2005 |
| JP | 2006183256 A | 7/2006 |
| WO | WO-93/08126 A1 | 4/1993 |

* cited by examiner

PLANT AND METHOD FOR MELTING AND CLEANING OF SNOW AND ICE

FIELD OF THE INVENTION

The present invention concerns the contaminated snow and ice, such as along roads in rural areas, and how the contaminated snow and ice can be handled in a better way with regard to the environment. Specifically, the invention concerns a plant for melting and purification of snow and ice, as well as a procedure whereby the plant is used.

BACKGROUND OF THE INVENTION AND PRIOR ART

Many places will be snow that falls down after a while become heavily polluted, especially in snowy densely populated areas, such as major cities in climate zones with significant snowfall in winter. A typical example is Oslo, Norway's capital, where urban traffic means that snow quickly becomes highly polluted. It has been customary to dump such polluted snow in the Oslo fjord, whereupon the pollution has been clearly visible, especially in the inner Oslo harbour. Alternatively, snow has been dumped on its own landfills, which unfortunately have often been near valuable river systems, with resulting severe pollution of waterways. One problem is where to contain the contaminated snow, but a more serious problem is how to avoid pollution of the fjord, rivers and ground around the landfill sites. There are commercially available systems for melting snow, such as the plants designated as Snow Dragon. However, there is little or no cleaning integrated with such systems, at best it is only a question of retention of heavy and large particles. Capacity is limited, as it is necessary that the snow is light and airy, and fuel consumption is high. For the time being most of the snow that lay down in the streets of Oslo city is gathered together and driven away in trucks to a facility some distance outside downtown. During and after heavy snowfalls heavy traffic of diesel-powered trucks are idling and waiting for a long time before they have emptied their loads, after which the cars drive back to the city centre to upload new contaminated snow and ice. The emissions of diesel and other contaminants are considerable, and there is no regular cleaning of the snow that is deposited, so that all pollutants are collected in the ground, flows into waterways or into groundwater reservoirs over time, and some leakage to air will also take place. Also, the collected snow typically contains significant amounts of garbage that is revealed as the landfill is melting in the summer season. It is proven that even snow that is considered to be pure, i.e. a maximum of one or two days old after a snowfall, is so heavily contaminated that nearby rivers can be classified as "very heavily polluted". In the city of Oslo there is now a requirement that all snow older than two days must be collected and deposited, but the landfill has as mentioned no self-cleaning and the transport involves considerable pollution. In addition, the snow can be highly polluted, although it is classified as plain, which is younger than two days old. There is a need for a plant and a method, which completely or in part solve the above mentioned problems, that is to reduce pollution from contaminated snow and the handling thereof.

SUMMARY OF THE INVENTION

The present invention meets the above-mentioned demand by providing a plant for melting and cleaning of snow and ice, distinguished in that the plant comprises a means for melting using enthalpy of a water source in order to melt snow and ice, and a means for cleaning for cleaning out the pollution from the water phase that contains the melted snow and ice.

According to the invention, it is not the snow and/or ice per se that is cleaned, but the water phase including the melted snow and ice. The melting takes place without burning fuel to heat the water from the water source, the source of water is preferably a surface water source, preferably a low temperature reservoir, possibly supported by any hot water, such as pump cooling water, available without burning fuel to provide such hot water. From low temperature reservoirs, such as the sea at about 25 m depth or deeper, an enthalpy of a few centigrades, e.g. 3° C., is available even in winter, the less enthalpy available the more amount of water must be used in order to provide sufficient enthalpy to melt the snow and ice. It is previously known that warm water from the underground can be used to melt snow and ice, but not combined with cleaning of the resulting water phase, and not in the scale required for cleaning polluted snow from a large city, and not without expensive wells or lots of natural geothermal heat for producing said warm water.

With "cleaning out the pollution from the water phase", it is meant to clean out as much as possible or as practicable of dissolved contaminants in the water phase and also non-dissolved pollutants such as particulates and contaminants bound to the particles. With a "water source" it is meant, for example, the sea or a fjord, such as the Oslo fjord, a large lake or river, or another major water source large enough to allow removal of some enthalpy or heat energy without causing significant problems.

The invention also provides a method for melting and cleaning of snow and ice, using the plant of the invention, distinguished in that the method comprises to supply polluted snow and ice to the plant, to melt down snow and ice using the enthalpy of a water source, and to clean the water phase including the melted snow and ice.

The contaminated snow collected will according to experience also contain some ice and garbage, especially old snow. The plant preferably includes means for separating out garbage, using a grating, drum or similar at the intake 1, providing a coarse filtration. The plant preferably includes means to be able to shake the grating or drum, as well as means to inject relatively warm water, so that larger lumps of ice more easily are melted down and do not clog the grating or drum, so that larger objects can be sorted out easily.

The facility preferably includes one or more steps with crushing of ice, which is preferable for achieving a large surface so that the energy for melting is reduced. The plant preferably includes means for coarse crushing and means for fine crushing 2, which means are put into service according to need. Crushing means can preferably be designed as rotating shafts 13 with pallet arms, chains and other devices that grind clumps to increasingly smaller size. Because of widely varying load or utilization of the plant, and high maximum power needs, it is generally inconvenient to be dependent on general electrical power supply, so that the most practical solution is to have generators for production of necessary power. The cooling water from the generators can preferably be added in the incoming contaminated snow, for incipient melting thereof. However, it may be necessary with separate oil/gas burners or other facilities to get enough hot water, in addition to the cooling water from any generators. Conveniently, means can direct hot water to where it is needed to avoid clogging of ice cubes. The plant preferably includes a convenient melting means in the form of an agitation chamber or equivalent, where agitation with hot water or added water, in the introduced snow and ice, is undertaken. The agitation chamber is either closed to water source, or taking in a greater or lesser quantity of water from the water source to melt snow and ice. Apart from any introduction of hot water, for example in the form of cooling water from the generators, the melting facility can be completely closed to the water source, i.e., the water source from which heat energy or enthalpy is obtained is in heat exchange in a closed system. It may be more convenient to have an open system, so that some water from the water source also is fed into the agitation chamber 3 which represents the melting facility. The plant also includes a cleaning means, for example in the form of an outlet chamber 10 arranged to take out fine particles, oil and other types of pollution from the now melted water containing various amounts of different types of pollution. Cleaning means can be of many kinds, such as collection means in the form of absorption devices, such as absorption trains, it can be precipitation devices such as settling tanks, plate separators, lamellar or drum separators 5 or other known cleaning devices. Other devices may include or use chemical and physical filtration, such as filters or sandfilters, for example calcareous sand that take out typical 60% of heavy metals released into the water, or shell sand, quartz sand or olivine sand. As cleaning means, compact and low energy consuming equipment for cleaning, such as lamellar and drum separators 5 and calcareous and olivine sand filters 4, are preferably used extensively. The plant can be placed on a vessel, such as a barge in or in close proximity to a downtown with frequent contaminated snow and ice. Alternatively, the plant can be located on land. The plant is also applicable in relation to major rivers or large lakes, such as near or in inland cities.

A modular plant on a barge in or in close proximity to a city is considered to be particularly advantageous, because transport routes are short and the plant may be in operation for short, but very intense periods of the winter season, so that some of the plant modules can be stored onshore in the summer season while the barge for example can be used for purification of polluted seabed in the harbour, as the barge in the summer season can be supplemented with other modules adapted to such other purpose. In one embodiment of the invention the cleaning means is an ordinary sewage and surface water treatment plant. For example, the plant is arranged on a barge where the modules for the meltdown are located, while all or part of the water containing the melted snow and ice is directed into a nearby existing water treatment plant. An embodiment of the invention has the plant built into a quay at or near the area where the snow can be dumped with the lowest possible resulting transportation route, so the quay area incidentally can be used as before. The plant according to the invention also purifies water from the water source if it is contaminated in the first place, especially if much of the water from the water source is mixed in and carried through the means for cleaning. The plant and the method according to the invention can optionally contain all the features mentioned in this document, in any combination, of which the most preferred combination must be adapted to each case.

FIGURES

Figure 2:
Figure 2:
Figure 3:
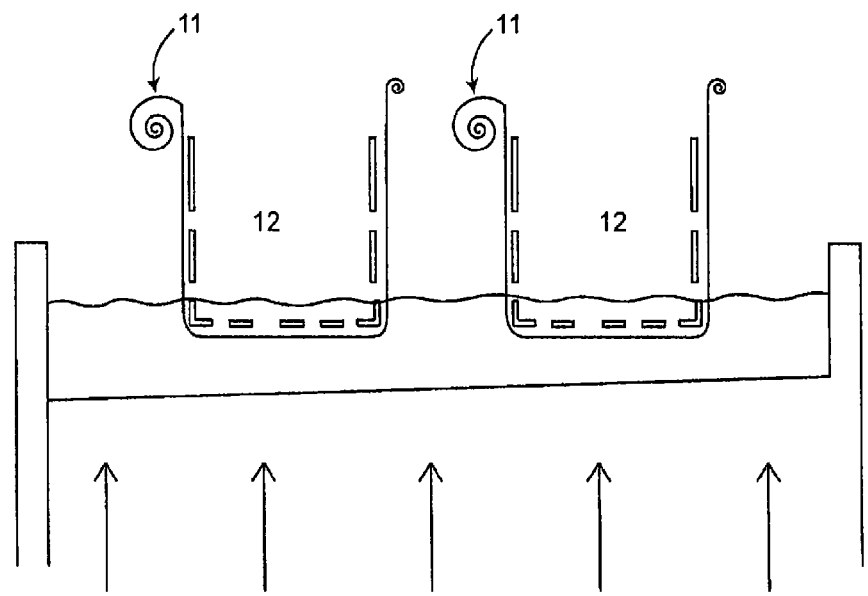
Figure 4:
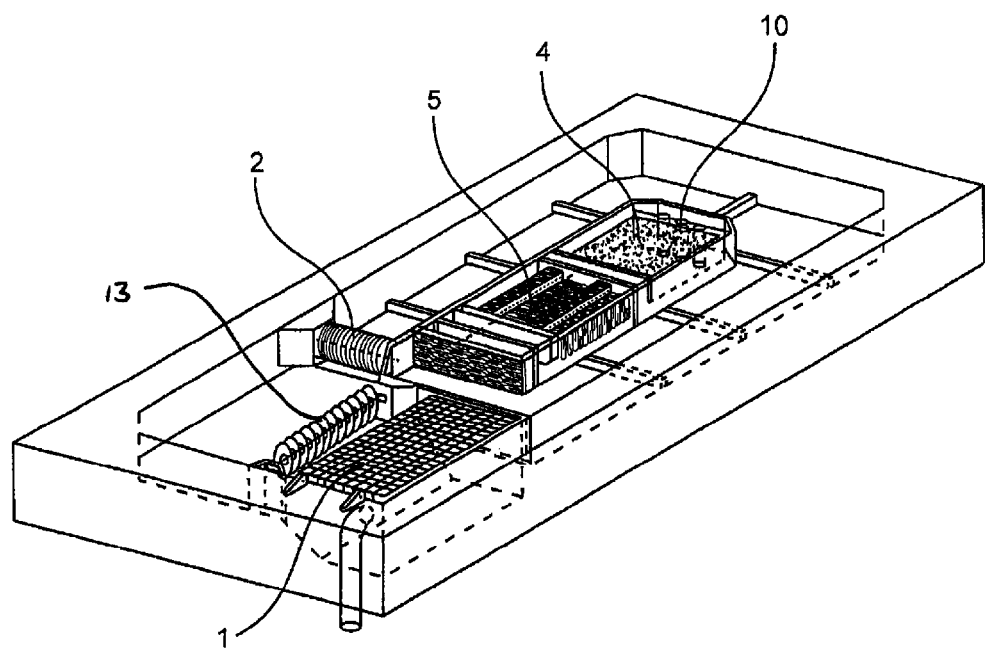

An embodiment of a plant according to the invention is illustrated in FIGS. 1-4, of which FIG. 1 shows a plan drawing of a plant according to the invention, FIG. 2 shows a process line AA along the main process center line, along the line AA in FIG. 1, FIG. 3 shows features at the outlet from the lamellar separator of FIG. 1, as a filter cloth is arranged around the outlet to avoid clogging and to prolong the service life of the downstream sand filter, and FIG. 4 shows the plant illustrated in FIG. 1, but three dimensional and viewed obliquely.

Figure 5:
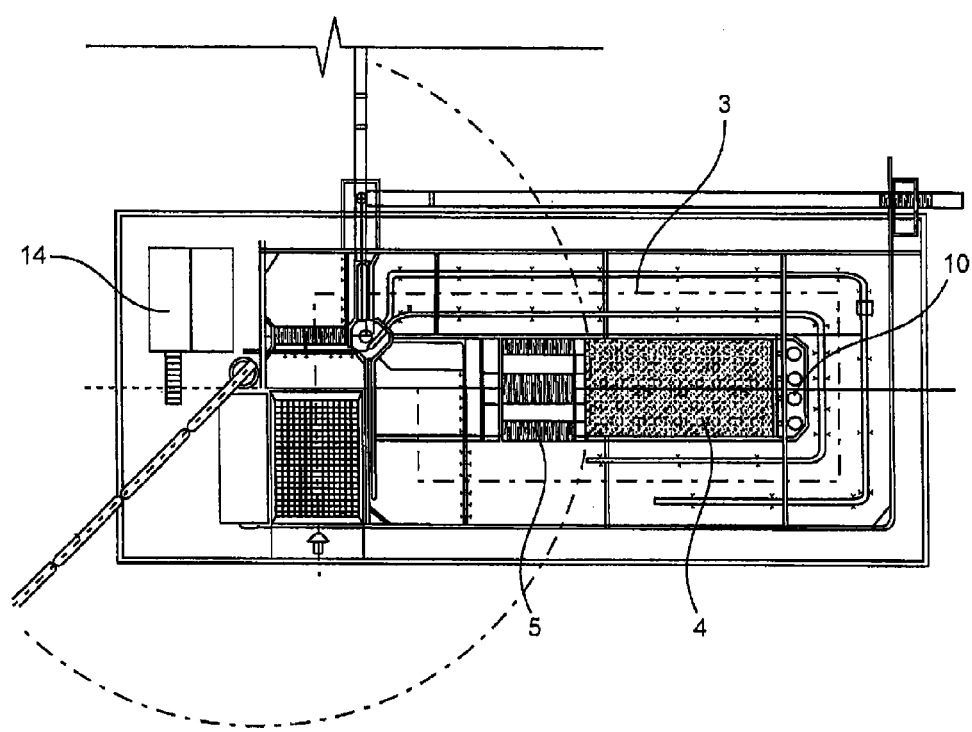

FIG. 5 is a plan of a plant of the invention.

DETAILED DESCRIPTION

We assume that the figures in general are self-explanatory for persons skilled in the art. Calculations have been made for a centrally located plant for the city of Oslo. The reduction as a result of reduced traffic alone, ie without the effect of the treatment plant included, is estimated to be 2.6-2.9 tons of NOx, 1.5 tons of CO, 0.3 tons of VOC, 0.1 tons of particulates and 340-450 tons of CO2. If the plant is implemented on an existing barge or placed on land, the savings in emissions of $SO_2$ from the transport 0.15 tonnes.

The reduction in emissions when taking into account that no fuel must be burned or no electric power used in order to melt the snow and ice, and adding the emissions cleaned out from the melted snow and is, is many times larger than the figures mentioned above. The only essential feature requiring power is a pump or flow device used to pump for example seawater at 4° C. into a plant of the invention, taking out for example 3.5° C. of heat energy, discharging water at 0.5° C. after cleaning the mixture of seawater and melted snow and ice, assuming the heat exchange is an open mixing type.

For a city like Oslo, the melting of snow and ice will typically require an enthalpy of 24.3 MW, for an assumed peak load of melting 500 m$^3$/hour snow with some ice per hour, consuming 350 kJ/kg for melting. Taking out 3.5° C. from the water of a low temperature water source for melting, will require a pump delivering 5800 m$^3$/hour. Pumping up seawater from below 25 m depth, and lifting the water 4 m from a pump located at sea level, will require a pump using about 0.082 MW power. Adding power for possible and preferable crushing and agitation, the total plant power requirement will be about 0.1 MW. Using the cooling water of the pump for melting and to avoid clogging, will reduce the water flow rate requirement. Prior art technology using heaters run by burning fuel or consuming electricity, will require 25 MW compared to 0.1 MW for operation. Prior art plants will thereby burn 2640 liter diesel per hour or 1884 kg propane per hour. A prior art plant operating on diesel will emit 7920 kg $CO_2$ per hour for melting snow and ice, compared to 0 for a plant according to the invention. Additionally, the plant of the invention provides effective cleaning and can be located at a site for minimum transport requirement.

FIG. 2 shows a process line 6 along the main process center line. FIG. 3 shows features at the outlet 12 from the lamellar separator 5 of FIG. 1, as a filter cloth 11 is arranged around the outlet 12 to avoid clogging and to prolong the service life of the downstream sand filter 4.

Essential features of the invention are to use in substance natural low temperature water in heat exchange for melting, in order to reduce the power requirement for melting dramatically, the melting is required for effective subsequent cleaning as snow and ice per se is difficult to clean effectively, and to including the means for cleaning in order to solve the pollution problem as discussed in the introduction of the description. The means for melting mainly consists of an enthalpy chamber for heat exchange with a natural low temperature water source for melting snow and ice.

The invention claimed is:

1. A barge mounted plant for melting and cleaning polluted snow and ice, the plant comprising:
   a means for crushing of ice;
   a means for sorting out larger objects from said polluted snow and ice arranged upstream of said means for crushing of ice;
   a means for melting using enthalpy of a surface water source in order to melt snow and ice without heaters for melting by burning fuel or consuming electricity;
   a pump for pumping water from said surface water source to said barge mounted plant; and
   a means for cleaning out pollution from the water phase resulting from the melting of said polluted snow and ice.

2. The barge mounted plant of claim 1, wherein said surface water source is selected from the group consisting of a sea, fjord, lake, or river.

3. The barge mounted plant of claim 1, wherein the means for crushing of ice comprises a rotating shaft.

4. The barge mounted plant of claim 1, wherein the means for crushing of ice comprises chains.

5. The barge mounted plant of claim 1, wherein the means for sorting comprises a grating.

6. The barge mounted plant of claim 1, wherein the means for sorting comprises a drum.

7. The barge mounted plant of claim 1, wherein the means for melting comprises an agitation chamber.

8. The barge mounted plant of claim 1, wherein the means for cleaning comprises an absorption train.

9. The barge mounted plant of claim 1, wherein the means for cleaning comprises a settling tank.

10. The barge mounted plant of claim 1, wherein the means for cleaning comprises a plate separator.

11. The barge mounted plant of claim 1, wherein the means for cleaning comprises a lamellar separator.

12. The barge mounted plant of claim 1, wherein the means for cleaning comprises a drum separator.

* * * * *